US007400333B1

(12) United States Patent
Trottier et al.

(10) Patent No.: US 7,400,333 B1
(45) Date of Patent: Jul. 15, 2008

(54) VIDEO DISPLAY SYSTEM WITH TWO CONTROLLERS EACH ABLE TO SCALE AND BLEND RGB AND YUV SURFACES

(75) Inventors: Lorne Trottier, Beaconsfield (CA); Yves Tremblay, Pointe-Claire (CA); Gilles Forest, Blainville (CA)

(73) Assignee: Matrox Graphics Inc., Dorval, Quebec (CA)

( * ) Notice: Subject to any disclaimer, the term of this patent is extended or adjusted under 35 U.S.C. 154(b) by 1736 days.

(21) Appl. No.: 09/526,442

(22) Filed: Mar. 16, 2000

(51) Int. Cl.
*G09G 5/02* (2006.01)
*G09G 5/373* (2006.01)
*G09G 5/377* (2006.01)
*G06T 3/40* (2006.01)

(52) U.S. Cl. .................. 345/603; 345/634; 345/667
(58) Field of Classification Search ............... 345/1.1, 345/1.3, 3.1–3.4, 603, 634–638, 667–671
See application file for complete search history.

(56) References Cited

U.S. PATENT DOCUMENTS

| | | | |
|---|---|---|---|
| 4,875,173 A | 10/1989 | Nakajima | |
| 4,926,166 A | 5/1990 | Fujisawa et al. | |
| 4,965,745 A * | 10/1990 | Economy et al. | 345/603 |
| 5,125,043 A | 6/1992 | Karlsson | |
| 5,150,109 A | 9/1992 | Berry | |
| 5,172,103 A | 12/1992 | Kita | |
| 5,187,776 A | 2/1993 | Yanker | |
| 5,195,174 A | 3/1993 | Kagawa | |
| 5,227,771 A | 7/1993 | Kerr et al. | |
| 5,327,156 A | 7/1994 | Masukane et al. | |
| 5,479,184 A | 12/1995 | Tokumitsu | |
| 5,488,385 A | 1/1996 | Singhal et al. | |
| 5,539,426 A | 7/1996 | Nishikawa et al. | |
| 5,585,821 A | 12/1996 | Ishikura et al. | |
| 5,596,346 A | 1/1997 | Leone et al. | |
| 5,694,141 A * | 12/1997 | Chee | 345/3.1 |
| 5,710,570 A | 1/1998 | Wada et al. | |
| 5,748,044 A | 5/1998 | Xue | |
| 5,764,201 A | 6/1998 | Ranganathan | |
| 5,767,834 A | 6/1998 | Vouri et al. | |
| 5,805,132 A | 9/1998 | Imaizumi et al. | |
| 5,841,418 A | 11/1998 | Bril et al. | |
| 5,874,928 A | 2/1999 | Kou | |
| 5,880,709 A | 3/1999 | Itai et al. | |
| 5,910,795 A | 6/1999 | Whittaker | |
| 5,977,933 A | 11/1999 | Wicher et al. | |
| 6,018,340 A | 1/2000 | Butler et al. | |
| 6,020,863 A | 2/2000 | Taylor | |
| 6,028,585 A | 2/2000 | Ishii et al. | |
| 6,084,565 A | 7/2000 | Kiya | |
| 6,177,946 B1 * | 1/2001 | Sinclair et al. | 345/3.1 |
| 6,297,817 B1 * | 10/2001 | Larson et al. | 345/1.1 |

\* cited by examiner

*Primary Examiner*—Jeffery A. Brier
(74) *Attorney, Agent, or Firm*—Ogilvy Renault LLP

(57) ABSTRACT

Multiple independent displays from one graphics controller can be driven in a wide variety of modes using multiple display controllers. This invention incorporates a unique combination of enhancement building on a generic single multi-display graphics subsystem. Digital video is gaining vast popularity in the worldwide consumer, professional and commercial market. The applications of this invention cover all these market segments and include (but are not limited to) Digital Content Creation, Digital video playback, digital entertainment, DVD Authoring etc etc.

7 Claims, 4 Drawing Sheets

VIDEO DISPLAY SYSTEM WITH TWO CONTROLLERS EACH ABLE TO SCALE AND BLEND RGB AND YUV SURFACES

This application is related to commonly assigned co-pending application Ser. No. 09/526,440 filed Mar. 16, 2000 entitled "MULTIPLE DISPLAY DEVICE DISPLAY CONTROLLER WITH VIDEO OVERLAY AND FULL SCREEN VIDEO OUTPUTS", the specification of which is hereby incorporated by reference.

FIELD OF THE INVENTION

The present invention relates to a single controller system for multiple display output.

BACKGROUND OF THE INVENTION

Video display controllers are known which are able to work with both RGB format video and YUV format video to combine two video surfaces from graphics memory to provide an overlay output. This is useful, for example, in the situation that a movie source in YUV format is obtained by decoding a video file from say a CD-ROM or DVD device, and written to a video surface in graphics memory. At the same time a computer environment desktop is stored in RGB format in another surface within graphics memory. These two surfaces can be combined to provide the YUV source within a window on the desktop. Because the video display controller handles the conversion, scaling and mixing of the two sources, the computer operating system or application program does not directly create the desired display, but rather instructs the display controller system to scale and combine the two sources as desired. The quality of display and efficiency of the computer system is thereby greatly enhanced. An example of such a system is described in U.S. Pat. No. 5,764,201 to Ranganathan.

In such displays controller systems, only one combined output of mixed format video is possible in which case the second output can only mirror what is being displayed by the first output. Furthermore, since only two surfaces (one RGB and one YUV) are being fetched one for each of only one RGB pixel path and only one YUV pixel path, the degree of flexibility is further limited, and it would be desirable to have greater control over surface selection, combination, scaling and output.

SUMMARY OF THE INVENTION

It is therefore a first object of the present invention to provide an apparatus and a method for controlling a single graphic controller system with a single memory subsystem having at least two display outputs, in which control of surface selection, conversion, combination, scaling and output is afforded without the limitations known in the prior art.

According to the invention, there is provided a method of providing a display output for at least two display devices using a single controller system. The method comprises:

providing a first display controller able to read from a graphics memory at least two first surfaces into at least two first pixel paths, convert the pixel format of at least one of the at least two first surfaces, scale at least one of the at least two first surfaces, and combine (at least one of blending and overlaying) the at least two first surfaces, where at least one of the first pixel paths supports any one of RGB and YUV pixel format and at least one of the pixel paths supports at least RGB pixel format; providing a second display controller able to read from a graphics memory at least two second surfaces, convert the pixel format of at least one of the at least two second surfaces, scale at least one of the at least two second surfaces, and combine the at least two second surfaces, where at least one of the pixel paths supports any one of RGB and the YUV pixel formats and at least one of the pixel paths supports at least an RGB pixel format;

causing the first display controller to select and read the first surfaces, convert the first surfaces into a like first format at least when the first surfaces are not all in the like first format, scaling at least one of the first surfaces, combining (at least one of blending and overlaying) the first surfaces to obtain a blended first surface, and outputting the combined first surface to provide a first output stream of pixel data;

causing the second display controller to select and read the second surfaces, convert the second surfaces into a like second format at least when the second surfaces are not in the like second format, scaling at least one of the second surfaces, combining (at least one of blending and overlaying) the second surfaces to obtain a blended second surface, and outputting the combined second surface to provide a second output stream of pixel data. In this way, flexibility is provided by selection of the first and second surfaces as well as scaling and combining of the first and second surfaces, whether the surfaces are in RGB format, YUV format or mixed RGB/YUV format. It will be appreciated that any of the surfaces could be common between the two controllers. This enables the same surface to be displayed on the two displays in different ways, formats and blended with different surfaces.

While the preferred embodiment suggests that any of the scalers be part of the controllers, the functioning of any of these scalers can be carried out by using the scaling capabilities of the graphic controller system's drawing engine whereby that particular scalar may be removed from the preferred embodiment.

Preferably, the first output stream and the second output stream are fed into a first multiplexer and a second multiplexer, an output of the first multiplexer being fed into a first display, and an output of the second multiplexer being fed into a second display, and the method further comprises causing the multiplexers to select a desired one of the output streams for display on the first and second displays.

Also preferably, the first display controller reads two first surfaces, has at least one controllable color space converters outputting a selected one of RGB and YUV pixel format, and two scaling units scaling an output of the two color space converters, and a combining unit receiving an output of the two scaling units. The method then preferably includes causing the two scaling units to scale each of the two first surfaces. While the preferred embodiment includes two scalers, fewer or more scalers can be used. As an example, the two scaling units can be replaced by one scaler scaling the output of the combining unit in a case where it is known that the two surfaces do not need to be scaled independently.

The single controller system may alternatively comprise a drawing engine scaler instead of any one or all backend scalers responsive to a scaling command to pre-scale at least one surface in the graphics memory and output a scaled version in a scaled surface in the graphics memory; and one of the steps of causing the first display controller and causing the second display controller may comprise one of scaling the at least one of the first surfaces and the at least one of the second surfaces, respectively, using the drawing engine and reading the at least one of the first surfaces and the at least one of the second surfaces, respectively, from the scaled surface.

While the description of the invention uses two controllers as the preferred embodiment, it can easily be extended or scaled to additional controllers.

Two independent display controllers (primary display and secondary display controller) each able to generate a stream of pixel data and associated synchronization signals (syncs) from pixel data contained in a display memory (surfaces). Each display controller can combine (overlay or blend) two or more surfaces using two or more pixel paths with or without scaling in a wide variety of pixel formats and color spaces. (Note that the number of surfaces can be more than two while still remaining within the scope and spirit of the invention). This provides a great deal of capability and flexibility, which enables a host of useful new features to the end user. The two display controllers can drive a variety of output ports including any combination of RGB D/A converters, video encoder, and TDMS Panel Link or LCD interface. This permits many display combinations such as two RGB monitors, two TV monitors, two flat panel displays or any mix of them.

The primary display controller can read two surfaces from display memory into two pixel paths. Each surface can be in any one of a variety of pixel data formats such as YUV (4:2:0, 4:4:2 etc.) and RGB (8, 16, 24, 32). The primary display controller can combine (overlay or blend) the two surfaces together. One or both of the surfaces can optionally be re-scaled using either one of or all of the backend scalers before or after being combined using the appropriate backend scaler or the 3D drawing engine into a display surface in memory before even being read by the display controller. A fixed or programmable color space converter is included in one or both pixel data paths, so that combined pixels are in the same color space. For example, a surface can be in YCbCr or YUV format (video) and is converted in RGB (graphic) format before being combined with the RGB Windows desktop. Typically, but not exclusively, this is used to display a video surface (video in a window) under a graphic overlay surface (e.g. 2D desktop). One of the overlay surface can be a graphic bitmap. Typically, but not exclusively, this is used to display a DVD sub-picture overlay (or blended) surface over a DVD decoded picture.

The secondary display controller can also simultaneously read 2 surfaces from display memory into two pixel paths and combine them together. The secondary display controller can be identical to the primary display controller, or it can support a subset of the full feature set. For example, the secondary display controller's main surface could either be in YCbCr (4:4:4, 4:2:2, 4:1:1, 4:2:0) or RGBalpha (8, 16, 24, 32 bpp) format which allows for various types of surfaces to be displayed (grabbed video from video input port, S/W decoded video, graphic images etc.). The second overlay surface can be a graphic bitmap or other type of surface. Typically, but not exclusively, this is used to display a DVD sub-picture overlay surface over a DVD decoded picture. Note that in single chip multi-display controllers of prior art, blending and scaling units are limited to one controller only and/or a total of only two pixel paths are present. This invention requires the incorporation of at least one of such units and at least two pixel paths in each of at least two controllers in order to increase flexibility.

One or more CRTCs can be set to convert a 16 or 32 bpp RGBalpha format into a YUV 4:2:2+ alpha format. When RGB32 is output as YUV 4:2:2+ alpha data (upper 8 bits out of RGB32), the alpha data is useful as a key signal. This mode is useful for outputting a Windows desktop surface as a standard video signal. It is also useful for using the video controller as a source of graphics plus key for professional video graphics and titling applications.

One of the main applications of the invention is where the second display can show a video image full screen while the main display maintains a separate image such as a fully interactive Windows desktop. The video from the second display can also be replicated on the first display within a window. For the video on both displays to have sub-picture blending, both controllers must have sub-picture blending units.

BRIEF DESCRIPTION OF THE DRAWINGS

The invention will be better understood by way of the following detailed description of a preferred embodiment with reference to the appended drawings, in which.

DETAILED DESCRIPTION OF THE PREFERRED EMBODIMENT

Figure 1:
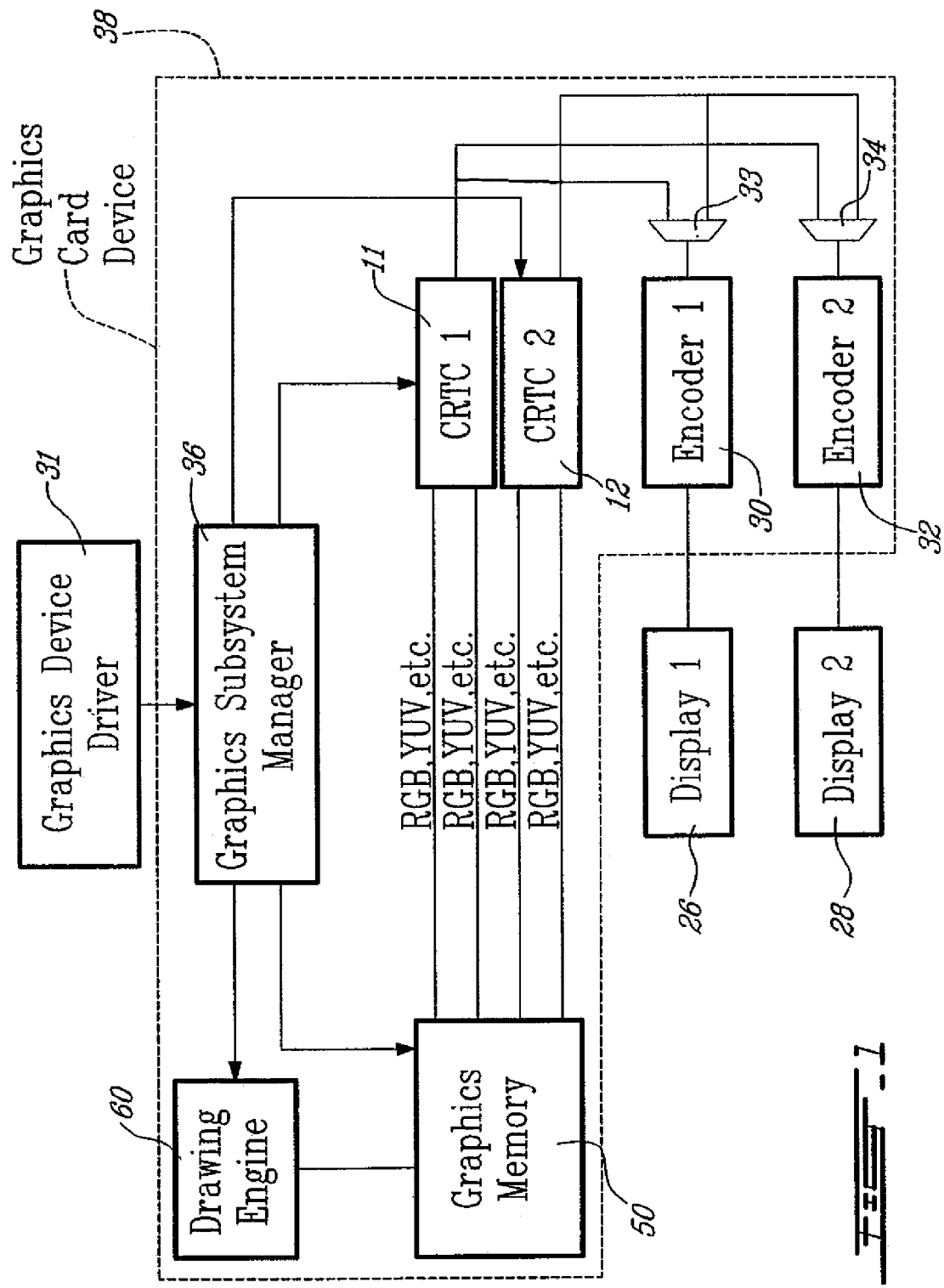
FIG. 1 is a schematic block diagram of a single controller system for providing dual display output according to the preferred embodiment.

FIG. 1 shows a high level block diagram of the invention. Two CRTC controllers 11, 12 are capable of fetching 2 surfaces from memory 50 which can be SGRAM, SDRAM, or any other type of Random Access Memory. These surface can be in a variety of pixel formats including but not limited to RGB (8, 16, 24, 32) and YUV (4:2:0, 4, 2, 2). The output of each CRTC 11, 12 can be displayed on a CRT monitor, TV or flat Panel displays 26, 28 via appropriate converters, encoders 30, 32 and transmitters. The Multiplexers 33, 34 allow routing of the output of each CRTC 11, 12 to either display 26, 28. This allows either display 26, 28 to receive the output from either CRTC 11, 12.

Figure 2:
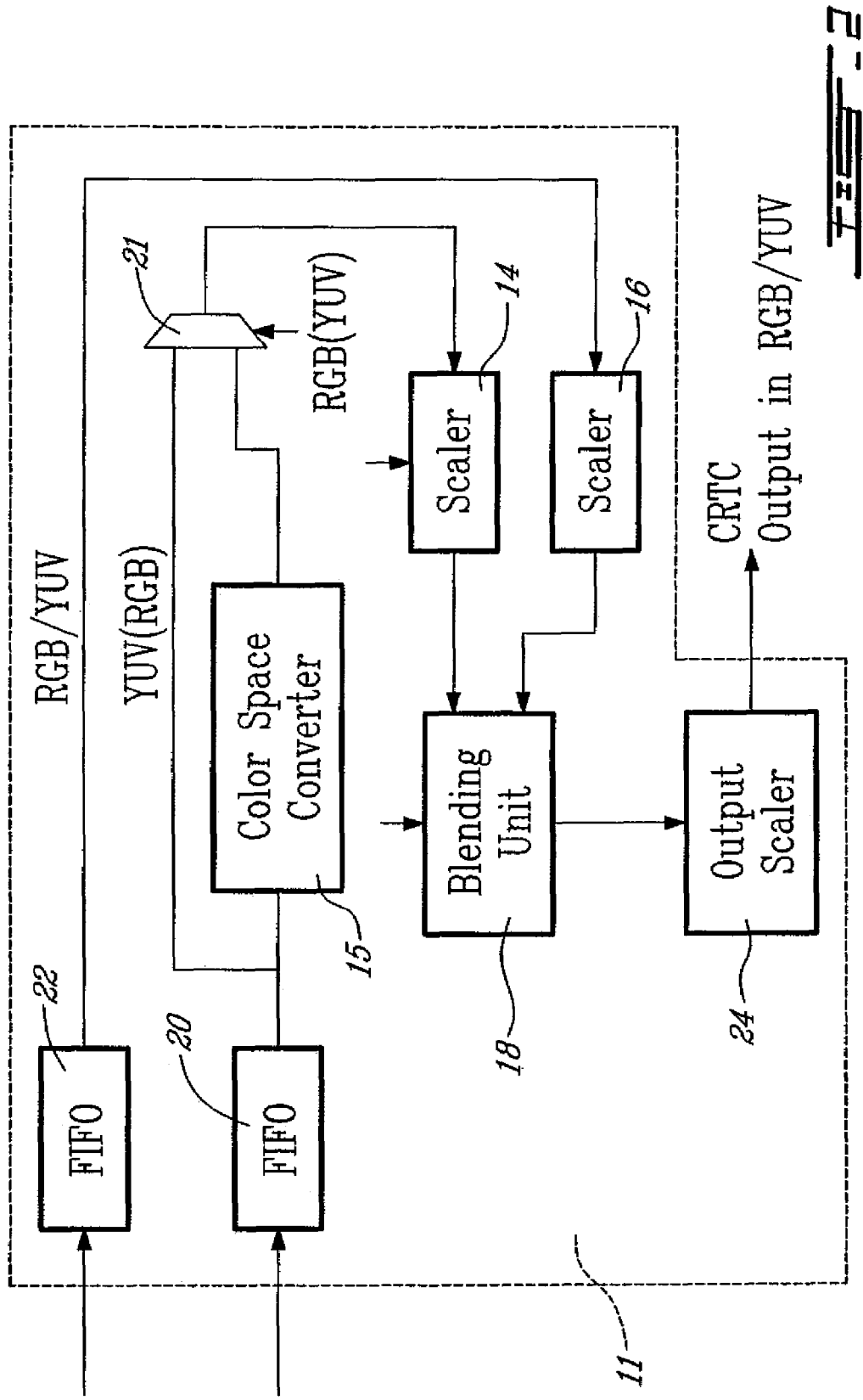
FIG. 2 is a schematic block diagram of a controller reading two surfaces of any of a plurality of video formats, carrying out conversion, if necessary, and scaling and combining (overlaying and/or blending) in accordance with the preferred embodiment.

Each CRTC contains one or more backend Scaler 14 (refer to FIG. 2) that allows the input surfaces to be re-scaled before being combined (overlaid, blended etc.) with the other surface. Alternatively, prescaling of any surface could be done by the drawing engine 60. A fixed or programmable color space converter 15 is included in one or both pixel data paths, so that combined pixels are in the same color space. For example, a surface can be in YCbCr format (video) and is converted in RGB (graphic) format before being combined with the RGB Windows desktop. Typically, but not exclusively, this is used to display a video surface (video in a window) under a graphic overlay surface (e.g. 2D desktop). Each CRTC 11, 12 also contains a combining unit 18 (or sub picture blending unit) for combining (overlaying or blending) the two surfaces. The output of the combining unit 18 is fed into a scaling unit 24 before being fed into a CRTC in RGB or YUV format.

Typically, the graphics memory 50 and one or all encoders are external of the discrete device (ASIC) containing the CRTCs, the drawing engine and the graphics subsystem manager. A graphics device driver 31 is also external to the graphics card device 38 and sends the appropriate control signals to the graphics subsystem manager 36. A first display 26 and a second display 28 receive the data encoded by Encoder1 30 and Encoder2 32.

Although conversion to RGB format is illustrated and preferred over conversion to YUV format, both types of conversion are possible.

Figure 3:
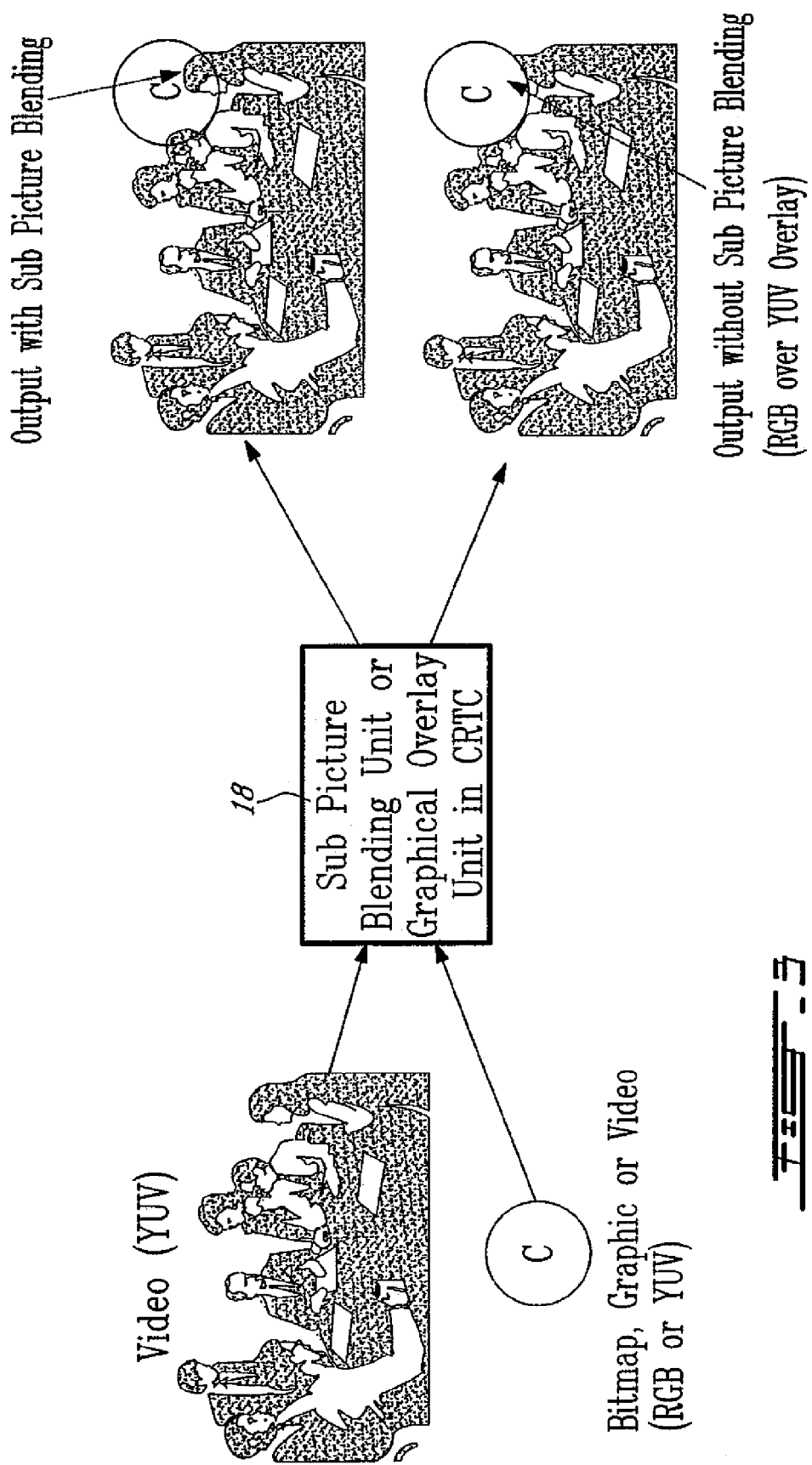
FIG. 3 is a pictoral diagram of two different surfaces in graphics memory showing the result of combining with sub-picture blending and overlaying.

FIG. 3 shows the results of combining a video surface with another surface (in this case a bitmap) using sub-picture blending (top right) or sub picture overlay (bottom right). One application of this would be adding logos, subtitles etc. Note in the case of DVDs (as an example) where the language of the subtitles is users selectable, the sub-titles are not embedded in the source of the YUV surface but are overlaid in realtime from a user selectable source.

The operation and design of the blending units 18 and other units within the CRTCs Scaler 14, 16 and CSC 15 are general and well known to someone skilled in the art and are therefore not described here.

Instead of using the backend scaler 14, 16, the 3D drawing engine 60 of the graphics controller can also be used for pre-scaling surfaces and storing them in memory.

While the scaling capabilities of the 3D drawing engine 60 are typically used for scaling textures for 3D objects, the capability can be leveraged to scale any type of surface by treating the surfaces as a texture. This also allows a CRTC 11, 12 having only one scaler to blend both of which need to be scaled, and this allows a CRTC 11, 12 having no scaler to blend surfaces in which at least one of the surfaces has been scaled prior to blending.

Figure 4:
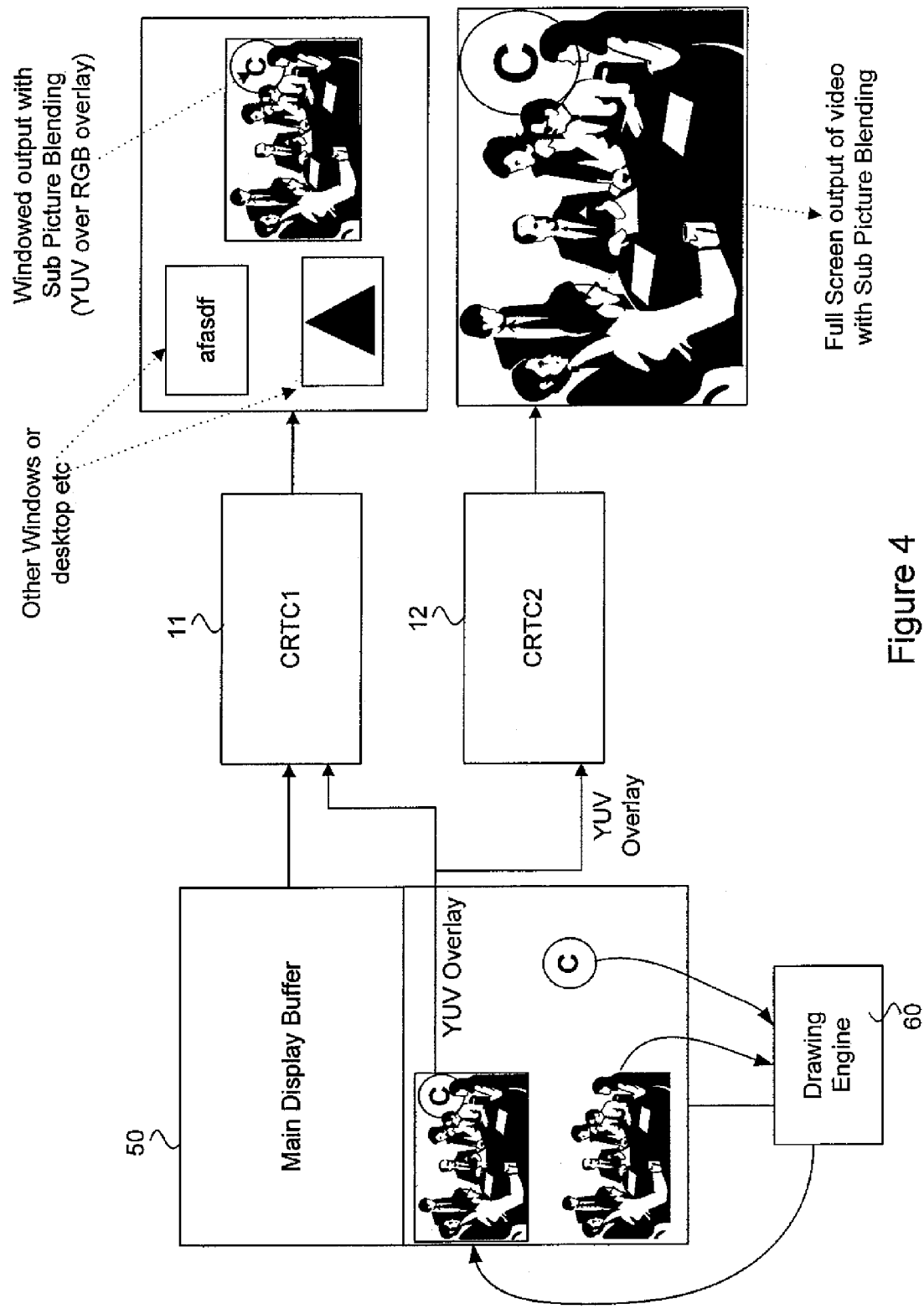
FIG. 4 is a schematic block diagram of an embodiment in which the 3D drawing engine is used to scale a DVD YUV surface and/or blend a graphic surface to create a YUV overlay surface for the first display and/or second display.

In the embodiment of FIG. 4, the YUV surface is processed by the drawing engine 60 in order to blend using the 3D drawing engine capability within the display controller apparatus to create a blended YUV surface. This blended surface is like the one which could also be achieved using a blending unit, namely the log is blended with the source video surface to generate the YUV overlay surface which is then read for display by CRTC2 in full screen output and separately read by CRTC1 for display within a window in the desktop. The output of CRTC1 11 includes a window containing a YUV video with sub-picture blending overlaid over the RGB desktop.

It will be appreciated that CRTC1 11 and CRTC2 12 each read two surfaces from one memory 50, and that one or both of these surfaces may be the same surfaces in which case the same surface can be displayed in different ways. The present invention is also not limited to reading only two surfaces into two pixel paths, but a CRTC 11, 12 may be designed to be controlled to read three or more surfaces into three or more pixel paths.

What is claimed is

1. A method of providing a display output for at least two display devices using a single graphic controller system, the method comprising:
   providing a first display controller able to read from a graphics memory at least two first surfaces into at least two pixel paths, convert at least one of the at least two first surfaces, scale at least one of the at least two first surfaces, and at least one of blend and overlay the at least two first surfaces, said first surfaces containing any one of RGB and YUV format video;
   providing a second display controller able to read from a graphics memory at least two second surfaces into at least two pixel paths, convert at least one of the at least two second surfaces, scale at least one of the at least two second surfaces, and at least one of blend and overlay the at least two second surfaces, said second surfaces containing any one of RGB and YUV format video;
   causing said first display controller to select and read said first surfaces, convert said first surfaces into a like first format at least when said first surfaces are not all in said like first format, scaling at least one of said first surfaces, at least one of blending and overlaying said first surfaces to obtain a combined first surface, and outputting said combined first surface to provide a first output stream of pixel data;
   causing said second display controller to select and read said second surfaces, convert said second surfaces into a like second format at least when said second surfaces are not in said like second format, scaling at least one of said second surfaces, at least one of blending and overlaying said second surfaces to obtain a combined second surface, and outputting said combined second surface to provide a second output stream of pixel data,
   whereby flexibility is provided by selection of said first and second surfaces as well as scaling and blending of said first and second surfaces, whether said surfaces are in RGB format, YUV format or mixed RGB/YUV format.

2. The method as claimed in claim 1, wherein in the first output steam and the second output stream are fed into a first multiplexer and a second multiplexer, an output of the first multiplexer being fed into a first display, and an output of the second multiplexer being fed into a second display, the method further comprising causing said multiplexers to select a desired one of said output streams for display on said first and second displays.

3. The method as claimed in claim 1, wherein:
   said first display controller reads two first surfaces, has at least one controllable color space converters outputting a converted one of said two first surfaces in a selected one of RGB and YUV format video, and one scaling unit scaling an output of said at least one color space converters and another scaling unit independently scaling another unconverted one of said two first surfaces, and a combining unit receiving an output of said two scaling units,
   the method comprising causing said two scaling units to scale each of said two first surfaces.

4. The method as claimed in claim 1, wherein:
   said first display controller reads two first surfaces, has at least one controllable color space converters outputting a selected one of RGB and YUV format video, and one combining unit combining an output of said at least one color space converters and another surface, and a scaling unit receiving an output of said combining unit,
   the method comprising causing said scaling unit to scale said combined surfaces.

5. The method as claimed in claim 1, wherein:
   said second controller reads two second surfaces, has at least one controllable color space converters outputting a converted one of said two first surfaces in a selected one of RGB and YUV format video, and one scaling unit scaling an output of said at least one color space converters and another scaling unit independently scaling another unconverted one of said two first surfaces, and a combining unit receiving an output of said two scaling units,
   the method comprising causing said two scaling units to scale each of said two second surfaces.

6. The method as claimed in claim 1, wherein:
   said second display controller reads two second surfaces, has at least one controllable color space converters outputting a selected one of RGB and YUV format video, and one combining unit combining an output of said at least one color space converter and another surface, and a scaling unit receiving an output of said combining unit,
   the method comprising causing said scaling unit to scale said combined surfaces.

7. The method as claimed in claim 1, wherein:

said single graphic controller system comprises a drawing engine scaler responsive to a scaling command to pre-scale at least one surface in said graphics memory and output a scaled version in a scaled surface in said graphics memory; and one of said steps of causing said first display controller and causing said second display controller comprises one of scaling said at least one of said first and second surfaces, respectively, using said drawing engine scaler and reading said at least one of said first and second surfaces, respectively, from said scaled surface wherein at least one of said first and second controllers does not have at least one scaling unit.

\* \* \* \* \*

UNITED STATES PATENT AND TRADEMARK OFFICE
Certificate

Patent No. 7,400,333 B1                                                                                    Patented: July 15, 2008

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Lorne Trottier, Beaconsfield (CA); Yves Tremblay, Pointe-Claire (CA); Gilles Forest, Blainville (CA); and Kamran Ahmed, Montreal (CA).

Signed and Sealed this Twenty-second Day of December 2009.

XIAO M. WU
*Supervisory Patent Examiner*
Art Unit 2628